United States Patent
Ahmad et al.

(10) Patent No.: US 11,645,207 B2
(45) Date of Patent: May 9, 2023

(54) PREFETCH DISABLE OF MEMORY REQUESTS TARGETING DATA LACKING LOCALITY

(71) Applicant: Advanced Micro Devices, Inc., Santa Clara, CA (US)

(72) Inventors: Masab Ahmad, Austin, TX (US); Derrick Allen Aguren, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/132,769

(22) Filed: Dec. 23, 2020

(65) Prior Publication Data

US 2022/0100664 A1  Mar. 31, 2022

Related U.S. Application Data

(60) Provisional application No. 63/083,648, filed on Sep. 25, 2020.

(51) Int. Cl.
*G06F 12/10* (2016.01)
*G06F 12/0862* (2016.01)

(52) U.S. Cl.
CPC .. *G06F 12/0862* (2013.01); *G06F 2212/6028* (2013.01)

(58) Field of Classification Search
CPC .............. G06F 12/0862; G06F 2212/6028
See application file for complete search history.

(56) References Cited

U.S. PATENT DOCUMENTS

| 9,535,696 | B1 | 1/2017 | Gschwind et al. |
| 2004/0268085 | A1* | 12/2004 | Hara ............... G06F 9/3804 |
| | | | 711/213 |
| 2015/0378919 | A1 | 12/2015 | Anantaraman et al. |
| 2017/0371564 | A1* | 12/2017 | Hou ............... G11C 7/00 |
| 2018/0157591 | A1 | 6/2018 | Wilkerson et al. |

(Continued)

OTHER PUBLICATIONS

"AMD64 Technology: AMD64 Architecture Programmer's Manual vol. 1: Application Programming", Publication No. 24592, Revision 3.22, Dec. 2017, 390 Pages.

(Continued)

*Primary Examiner* — Jae U Yu
(74) *Attorney, Agent, or Firm* — Kowert Hood Munyon Rankin and Goetzel PC; Rory D. Rankin

(57) ABSTRACT

A system and method for efficiently processing memory requests are described. A processing unit includes at least a processor core, a cache, and a non-cache storage buffer capable of storing data prevented from being stored in the cache. While processing a memory request targeting the non-cache storage buffer, the processor core inspects a flag stored in a tag of the memory request. The processor core prevents data prefetching into one or more of the non-cache storage buffer and the cache based on determining the flag specifies preventing data prefetching into one or more of the non-cache storage buffer and the cache using the target address of the memory request during processing of this instance of the memory request. While processing a prefetch hint instruction, the processor core determines from the tag whether to prevent prefetching.

13 Claims, 5 Drawing Sheets

(56) References Cited

U.S. PATENT DOCUMENTS

2018/0165204 A1      6/2018    Venkatesh et al.

OTHER PUBLICATIONS

Ho, "Optimization of Data Transfer on Many-Core Processors, Applied to Dense Linear Algebra and Stencil Computations", Performance [cs.PF], Université Grenoble Alpes, 2018, 144 pages, https://tel.archives-ouvertes.fr/tel-02426014/document [Retrieved Oct. 6, 2021].

Iglberger et al., "Expression Templates Revisited: A Performance Analysis of Current Methodologies", SIAM Journal on Scientific Computing, 2012, vol. 34, No. 2, pp. C42-C69, 28 Pages, https://blogs.fau.de/hager/files/2012/05/ET-SISC-Iglberger2012.pdf [Retrieved Oct. 6, 2021].

Krishnaiyer et al., "Compiler-Based Data Prefetching and Streaming Non-temporal Store Generation for the Intel® Xeon Phi™ Coprocessor", Parallel and Distributed Processing Symposium Workshops & PhD Forum (IPDPSW), 2013 EEE 27th International, 12 Pages, https://software.intel.com/content/dam/develop/external/us/en/documents/mtaap2013-prefetch-streaming-stores-326703.pdf [Retrieved Oct. 6, 2021].

McCurdy et al., "Characterizing the Impact of Prefetching on Scientific Application Performance", PMBS@SC, 2013, 9 Pages, https://www.dcs.warwick.ac.uk/~sdh/pmbs13papers/pmbs1400.pdf [Retrieved Oct. 6, 2021].

Sandberg et al., "Reducing Cache Pollution Through Detection and Elimination of Non-Temporal Memory Accesses", SC10, Nov. 2010, 11 Pages. http://uu.diva-portal.org/smash/get/diva2:372276/FULLTEXT01.pdf [Retrieved Oct. 6, 2021].

Khan et al., "A Case for Resource Efficient Prefetching in Multicores", 43rd International Conference on Parallel Processing, 2014, 10 Pages.

Ainsworth et al., "Software Prefetching for Indirect Memory Accesses: A Microarchitectural Perspective", ACM Journals, ACM Transactions on Computer Systems, vol. 1, Issue 1, Article 1, Mar. 2019, 34 Pages.

International Search Report and Written Opinion in International Application No. PCT/US2021/051834, dated Jan. 1, 2022, 12 pages.

\* cited by examiner

PREFETCH DISABLE OF MEMORY REQUESTS TARGETING DATA LACKING LOCALITY

CROSS REFERENCE TO RELATED APPLICATIONS

This application claims priority to Provisional Patent Application Ser. No. 63/083,648, entitled "IRREGULAR NON-TEMPORAL ACCESS BASED PREFETCH DISABLE" filed Sep. 25, 2020, the entirety of which is incorporated herein by reference.

BACKGROUND

Description of the Relevant Art

As both semiconductor manufacturing processes advance and on-die geometric dimensions reduce, semiconductor chips that include one or more processing units provide more functionality and performance. For example, a semiconductor chip can include one or more processing units. A processing unit can be representative of one of a variety of data processing integrated circuits. Examples of a processing unit is a general-purpose central processing unit (CPU), a multimedia engine for audio/video (A/V) data processing, a field programmable gate array (FPGA), an application specific integrated circuit (ASIC), and a parallel data processing engine such as a graphics processing unit (GPU), a digital signal processor (DSP), or other. The processing units process instructions of a general-purpose instruction set architecture (ISA), digital, analog, mixed-signal and radio-frequency (RF) functions, and so forth.

However, design issues still arise with modern techniques in processing and integrated circuit design that may limit potential benefits. One issue is interconnect delays continue to increase per unit length, high electrical impedance between individual chips also increases latency, and most software applications that access a lot of data are typically memory bound in that computation time is generally determined by memory bandwidth. The performance of one or more computing systems depends on quick access to stored data. The memory access operations include read operations, write operations, memory-to-memory copy operations, and so forth.

To resolve many of the above issues, one or more processing units use one or more levels of a cache hierarchy as part of a memory hierarchy in order to reduce the latency of a memory access request accessing a copy of data in system memory for a read or a write operation. A representative memory hierarchy transitions from small, relatively fast, volatile static memories, such as registers on a semiconductor die of a processor core and caches either located on the die or connected to the die, to larger, volatile dynamic off-chip memory, to relatively slow non-volatile memory. Generally, a cache stores one or more blocks, each of which is a copy of data stored at a corresponding address in the system memory.

One or more caches are filled both by demand memory requests generated by instructions being processed and by prefetch memory requests generated by a prefetch engine. A prefetch engine attempts to hide off-chip memory latency by detecting patterns of memory accesses to the off-chip memory that may stall the processor and initiating memory accesses to the off-chip memory in advance of the respective requesting instructions. The simplest pattern is a sequence of memory accesses referencing a contiguous set of cache lines (blocks) in a monotonically increasing or decreasing manner. In response to detecting the sequence of memory accesses, the prefetch unit begins prefetching a particular number of cache lines ahead of the currently requested cache line. However, since caches have finite sizes, the total number of cache blocks is inherently bounded. Additionally, there is a limit on the number of blocks that map to a given set in a set-associative cache. At times there are conditions that benefit from a finer limit on a number of cache blocks associated with a particular instruction type than a limit offered by the cache capacity or the cache associativity.

In view of the above, efficient methods and mechanisms for efficiently processing memory requests are desired.

Figure 1:
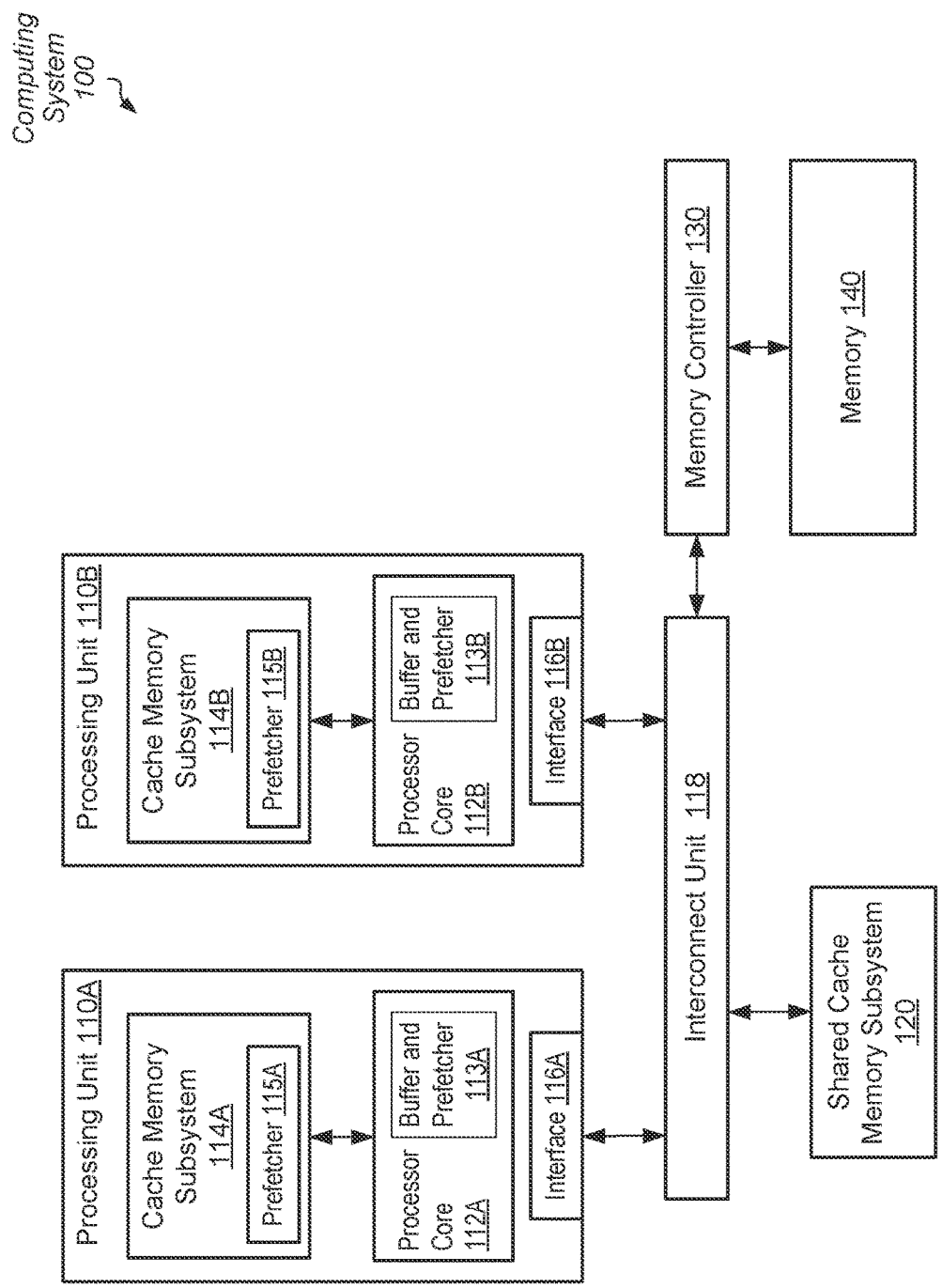
FIG. 1 is a generalized diagram of one embodiment of a computing system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention. Further, it will be appreciated that for simplicity and clarity of illustration, elements shown in the figures have not necessarily been drawn to scale. For example, the dimensions of some of the elements are exaggerated relative to other elements.

Systems and methods for efficiently processing memory requests are contemplated. A semiconductor chip can include one or more processing units. A processing unit can be representative of one of a variety of data processing integrated circuits. Examples of a processing unit is a general-purpose central processing unit (CPU), a multimedia engine for audio/video (A/V) data processing, a field programmable gate array (FPGA), an application specific integrated circuit (ASIC), and a parallel data processing engine such as a graphics processing unit (GPU), a digital signal processor (DSP), or other. A processing unit of the semiconductor chip includes at least one processor core and access to at least one cache (on-die or off-die) such as a level-one (L1) cache.

The processor core also uses a non-cache storage buffer capable of storing data prevented from being stored in the cache. In various embodiments, the processor core prevents storing particular data in the cache based on an indication in an opcode of a memory access instruction that specifies the requested data lacks one or more of temporal locality and spatial locality. The processor core prevents the requested data from being stored in the cache to reduce the penalties of cache pollution. Examples of these penalties are performance reduction, an increase in power consumption, and an increase in memory bus utilization. If the requested data that lacks one or more of temporal locality and spatial locality is stored in the cache, the number of cache misses increases. For example, when a particular set of a set-associative cache organization is full, data that has locality and is already stored in the particular set is evicted to create a storage location for the data. This is one example of cache pollution. Similarly, due to the recent placement of the data in the cache set, it is possible that other cacheable data in the cache set are now candidates for earlier eviction before the data. This is another example of cache pollution.

Preventing data that lacks one or more of temporal locality and spatial locality from being stored in a cache reduces the penalties of cache pollution. In various embodiments, one or more of a software designer, a compiler or other software determines which memory access instructions target data that lacks one or more of temporal locality and spatial locality. In one example, a compiler samples access counters to make this determination, and then the opcodes of these memory access instructions are modified to include opcodes that specify that the requested data of the memory access instructions lack one or more of temporal locality and spatial locality.

Rather than issue memory access instructions that request data that lacks one or more of temporal locality and spatial locality to the cache, the load/store unit (LSU) of the processor core issues these memory access instructions to the non-cache storage buffer that stores data prevented from being stored in the cache. As used herein, "memory requests" are also referred to as "memory access requests," and "access requests." "Memory access requests" include "read access requests," "read requests," "load instructions," "write access requests," "write requests," "store instructions," and "snoop requests."

As used herein, "data prefetching" or "prefetching" refers to the operation of prefetching data from lower-level memory into one or more of a cache and a non-cache storage buffer. The prefetched data includes any one of instructions of an application, application source data, intermediate data, and result data. In various embodiments, circuitry of the processor core inspects an indication stored in a tag of the memory request that specifies whether data prefetching is prevented or allowed during processing of this instance of a received memory request. In some embodiments, the tag of the received memory request includes this indication. In various embodiments, when the tag indicates that data prefetching is prevented during processing of this instance of the received memory request, other memory requests, such as younger in-program-order memory requests and other instances of this memory request which have yet to be processed, that have a same target address may have data prefetching allowed for the target address. Each of the tags of those memory requests also include a flag indicating whether to allow or prevent data prefetching during the processing of those instances of the memory requests. Therefore, control of data prefetching is at a granularity of the instance of the memory request being processed, rather than at a granularity of the target address.

A prefetch engine is capable of performing the operation of prefetching data, or data prefetching. As used herein, a "prefetch engine" is also referred to as a "prefetcher." The operation of prefetching includes performing one or more of prefetch training and generating prefetch requests. For example, the prefetch engine is capable of generating one or more memory access requests (prefetch requests) for data before the processor issues a demand memory access request targeting the prefetched data. In addition, the prefetch engine is also capable of performing prefetch training to determine whether to generate one or more prefetch requests based on a received target address.

When training, the prefetch engine identifies one or more of a sequence of memory accesses referencing a contiguous set of cache lines and a sequence of memory accesses referencing a set of cache lines separated by a stride between one another. It is possible and contemplated that the prefetch engine is capable of identifying other types of memory access patterns. When the prefetch engine identifies a memory access pattern, the prefetch engine generates one or more prefetch requests based on the identified memory access pattern. In some embodiments, the prefetch engine halts the generation of prefetch requests when the prefetch engine determines demand memory accesses provided by the processor core include request addresses that do not match the identified memory access pattern.

The LSU also executes prefetch hint instructions. As used herein, a "prefetch hint instruction" is one of a variety of types of memory access instructions inserted in the instructions of an application to prefetch particular data into one or more of the cache and the non-cache data storage before younger (in program order) demand memory access instructions request the prefetched data. Examples of these prefetch hint instructions are the AMD 64-bit instructions PREFETCHNTA directed at data that lacks temporal locality, PREFETCH1 that prefetches data into a level-one (L1) cache, and so forth. However, due to the non-temporal indication in particular prefetch hint instructions, such as the AMD 64-bit instructions PREFETCHNTA directed at data that lacks temporal locality, the processor core processes this prefetch hint instruction differently than other types of prefetch hint instructions. In various embodiments, circuitry of the processor core inspects an indication stored in a tag of the prefetch hint instruction that specifies whether data prefetching is prevented or allowed during processing of this instance of the prefetch hint instruction. The indication stored in the tag of the prefetch hint instruction is processed in a similar manner as described above for memory requests targeting data that lacks one or more of temporal locality and spatial locality.

Referring to FIG. 1, a generalized block diagram of one embodiment of a computing system 100 is shown. Computing system 100 includes processing units 110A-110B, interconnect unit 118, shared cache memory subsystem 120 and memory controller 130 capable of communicating with memory 140. Clock sources, such as phase lock loops (PLLs), interrupt controllers, power managers, input/output (I/O) interfaces and devices, and so forth are not shown in FIG. 1 for ease of illustration. It is also noted that the number of components of the computing system 100 and the number of subcomponents for those shown in FIG. 1, such as within each of the processing units 110A-110B, may vary from embodiment to embodiment. There may be more or fewer of each component/subcomponent than the number shown for the computing system 100.

In one embodiment, the illustrated functionality of the computing system 100 is incorporated upon a single integrated circuit. For example, the computing system 100 is a system on chip (SoC) that includes multiple types of integrated circuits on a single semiconductor die. The multiple types of integrated circuits provide separate functionalities. In other embodiments, the multiple integrated components are individual dies within a package such as a system-in-package (SiP), a multi-chip module (MCM), or a chipset. In yet other embodiments, the multiple components are individual dies or chips on a printed circuit board.

As shown, processing units 110A-110B include one or more processor cores 112A-112B and corresponding cache memory subsystems 114A-114B. Processor cores 112A-112B include circuitry for processing instructions. Processing units 110A-110B are representative of one of a variety of data processing integrated circuits. Examples of a processing unit is a general-purpose central processing unit (CPU), a multimedia engine for audio/video (A/V) data processing, a field programmable gate array (FPGA), an application specific integrated circuit (ASIC), and a parallel data processing engine such as a graphics processing unit (GPU), a digital signal processor (DSP), or other. Each of the processing units 110A-110B process instructions of a general-purpose instruction set architecture (ISA), digital, analog, mixed-signal and radio-frequency (RF) functions, and so forth.

The processor cores 112A-112B support simultaneous multi-threading. The multiple threads executed by processor cores 112A-112B share at least the shared cache memory subsystem 120, other processing units of different processing types (not shown) and I/O devices (not shown). The interconnect unit 118 includes one or more of routers, switches, buses, point-to-point connections, queues and arbitration circuitry for routing packets between components. In some embodiments, the interconnect unit 118 is a communication fabric. The packets include a variety of types such as memory access requests, responses, commands, messages and snoop requests. The interfaces 116A-116B support a communication protocol used for routing data through the interconnect unit 118 to the shared cache memory subsystem 120, the memory controller 130, I/O devices (not shown), a power manager (not shown), and other components.

The address space of the computing system 100 is divided among multiple memories. Memory maps are used to determine which addresses are mapped to which memories. In one embodiment, the coherency point for an address is the memory controller 130 connected to the memory 140 storing data corresponding to the address. Memory controller 130 includes circuitry for interfacing to the memory 140 and request queues for queuing memory requests and memory responses. Although a single memory controller 130 and memory 140 are shown, in other embodiments, the computing system 100 uses another number of memory controllers and memories. In various embodiments, memory controller 130 receives memory requests from the processing units 110A-110B, and schedules the memory requests, and issues the scheduled memory requests to memory 140.

The memory 140 is used as system memory in the computing system 100. The memory 140 stores an operating system that includes a scheduler for assigning software threads to hardware in the processing units 110A-110B. Memory 140 also includes one or more of a hypervisor, a basic input output software (BIOS) controlled function, one or more applications using utilizing application programmer interfaces (APIs), a page table storing virtual-to-physical address mappings and access permissions, source and result data for the applications, and so forth. The memory 140 uses any of a variety of types of memory devices.

Copies of portions of data stored in the memory 140 are stored in one or more of caches (114A-114B, 120). The memory hierarchy transitions from relatively fast, volatile memory, such as registers on a processor die and caches either located on the processor die or connected to the processor die, to non-volatile and relatively slow memory. In some implementations, the faster, volatile memory is considered to be at the top or at the highest level of the memory hierarchy, whereas, the slower, non-volatile memory is considered to be at the bottom or the lowest level of the memory hierarchy. In these implementations, a first level of the memory hierarchy located closer to the faster, volatile memory of the hierarchy than a second level of the memory hierarchy is considered to be at a "higher" level than the second level. In other implementations, the slower, non-volatile memory is considered to be at the top or at the highest level of the memory hierarchy. Although both ways of describing the memory hierarchy are possible and contemplated, in the following description, the faster, volatile memory is considered to be at the top or at the highest level of the memory hierarchy. Therefore, the higher levels of the memory hierarchy include the faster, volatile memory, such as processor registers and level-one (L1) local caches, while the lower levels of the memory hierarchy include the non-volatile, slower memory such as a hard disk drive (HDD) or a solid-state drive (SSD).

Cache memory subsystems 114A-114B and 120 use high speed cache memories for storing blocks of data. In some embodiments, cache memory subsystems 114A-114B are integrated within respective processor cores 112A-112B. Alternatively, cache memory subsystems 114A-114B are connected to processor cores 112A-112B in a backside cache configuration or an inline configuration, as desired. In various embodiments, cache memory subsystems 114A-114B are implemented as a hierarchy of caches. One or more levels of the cache hierarchy includes a translation lookaside buffer (TLB) for storing virtual-to-physical address mappings and access permissions, a tag array, a data array and a cache controller. One or more levels of the cache hierarchy also use a prefetch engine capable of generating prefetch requests to fill data from lower-level memory to the cache. Caches, which are nearer processor cores 112A-112B (within the hierarchy), are integrated into processor cores 112, if desired. In one embodiment, cache memory subsystems 114A-114B each represent L1 and L2 cache structures, and shared cache subsystem 120 represents a shared L3 cache structure. Other cache arrangements are possible and contemplated.

The circuitry of the processor cores 112A-112B implement the non-cache storage buffers 113A-113B using one or more of registers, one of a variety of flip-flop circuits, one of a variety of types of random access memories (RAMs), and a content addressable memory (CAM). The processor cores 112A-112B use non-cache storage buffers 113A-113B capable of storing data prevented from being stored in a cache. The memory 140 stores one or more of irregular memory bandwidth bound high-performance computing (HPC) applications and data center applications that use data corresponding to irregular memory accesses such as data lacking one or more of temporal locality and spatial locality. HPC applications are used in computational fluid dynamics, dense linear algebra libraries, climate and atmosphere modeling using high-order method modeling environment (HOMME), and other. Examples of the data center applications are social network crawlers, cloud stream analysis applications, internet map applications, and so forth.

Rather than issue memory requests that target data that lack one or more of temporal locality and spatial locality to the cache, such as the L1 cache of the processor cores 112A-112B, the processor cores 112A-112B issue these types of memory requests to the non-cache storage buffers 113A-113B. In various embodiments, the non-cache storage buffers 113A-113B use prefetchers. The prefetchers of the non-cache storage buffers 113A-113B are capable of generating prefetch requests to fill data from lower-level memory into the non-cache storage buffers 113A-113B. Similarly, the L1 caches of the cache memory subsystems 114A-114B use prefetchers 115A-115B capable of generating prefetch requests to fill data from lower-level memory into the L1 caches. The prefetchers of computing system 100 are capable of using a variety of prefetching methods known to those skilled in the art.

The circuitry of the processor cores 112A-112B inspect an indication, such as a flag, stored in a tag of the memory requests that target data that lack one or more of temporal locality and spatial locality. The flag indicates whether to allow or prevent data prefetching based on the target address of the memory requests during the processing of these instances of the memory requests. The flag is a field of one or more bits that specify whether data prefetching is allowed or prevented. If the flag specifies preventing data prefetching during processing of this instance of a received memory request, then data prefetching is prevented during processing of this instance of the received memory request. For example, circuitry of the processor cores 112A-112B prevents data prefetching by one or more of the prefetchers 113A-113B and the prefetch engines 115A-115B based on the target address of the received memory request during processing of this instance of the received memory request. Similarly, the circuitry of the processor cores 112A-112B inspect a flag stored in a tag of a prefetch hint instruction, and perform data prefetching based on a value stored in this flag in a similar manner.

Figure 2:
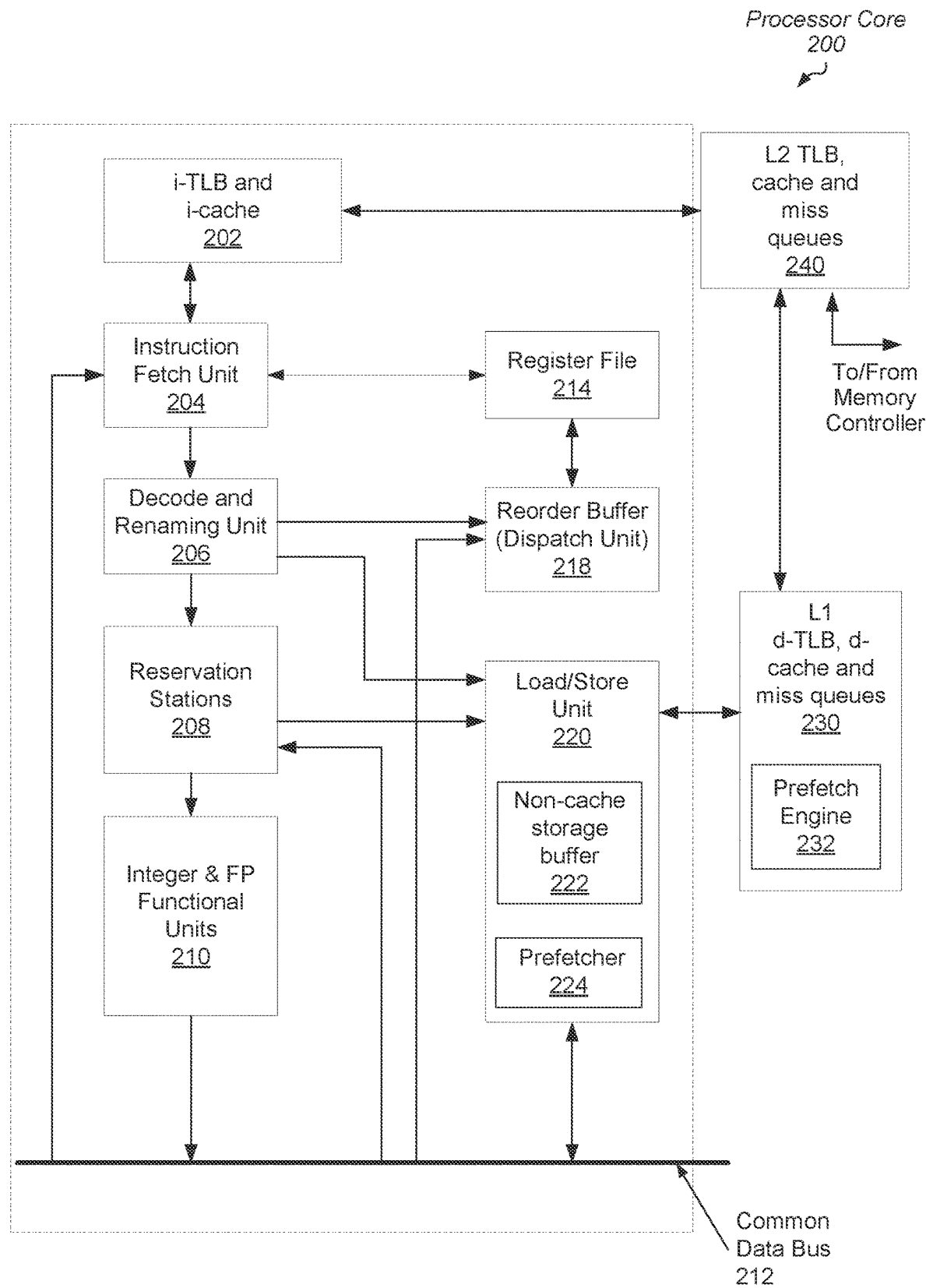
FIG. 2 is a generalized diagram of one embodiment of a processor core.

Referring to FIG. 2, one embodiment of a general-purpose processor core 200 that performs out-of-order execution is shown. In one embodiment, processor core 200 simultaneously processes two or more threads in a processing unit such as one of processing units 112A-112B (of FIG. 1). The functionality of processor core 200 is implemented by hardware such as circuitry. An instruction-cache (i-cache) of block 202 stores instructions of a software application and a corresponding instruction translation-lookaside-buffer (TLB) of block 202 stores virtual-to-physical address mappings needed to access the instructions. In some embodiments, the instruction TLB (i-TLB) also stores access permissions corresponding to the address mappings.

The instruction fetch unit (IFU) 204 fetches multiple instructions from the instruction cache 202 per clock cycle if there are no misses in the instruction cache or the instruction TLB of block 202. The IFU 204 includes a program counter that holds a pointer to an address of the next instructions to fetch from the instruction cache 202, which is compared to address mappings in the instruction TLB. The IFU 204 also includes a branch prediction unit (not shown) to predict an outcome of a conditional instruction prior to an execution unit determining the actual outcome in a later pipeline stage.

The decoder unit 206 decodes the opcodes of the multiple fetched instructions and allocates entries in an in-order retirement queue, such as reorder buffer 218, in reservation stations 208, and in a load/store unit (LSU) 220. In some embodiments, the decode unit 206 also performs register renaming. In other embodiments, the reorder buffer 218 performs register renaming. In some embodiments, the decoder 206 generates multiple micro-operations (micro-ops) from a single fetched instruction. In various embodiments, at least memory requests that target data that lack one or more of temporal locality and spatial locality include an indication, such as a flag within a tag, specifying whether to allow or prevent data prefetching based on the target address of the memory requests during the processing of those instances of the memory requests. In some embodiments, the decoder 206 inserts this flag in the tag of the decoded memory request. In various embodiments, the decoder 206 determines a value for the flag based on an opcode or other field of the received memory request. In one embodiment, when the flag is asserted, prefetching based on the target address of the received memory request is performed in a later pipeline stage during processing of this instance of the received memory request, but when the flag is negated, prefetching based on the target address of the received memory request is prevented from being performed in the later pipeline stage during processing of this instance of the received memory request. It is noted that in some designs a binary logic high value is used as an asserted value and a binary logic low value is used as a negated value, whereas, in other designs, a binary logic low value is used as an asserted value and a binary logic high value is used as a negated value. Other values indicating an asserted flag and a negated flag are possible and contemplated. For example, in some embodiments, the flag includes two or more bits, and the flag is capable of indicating prefetching is allowed for one type of storage, such as a non-cache storage buffer, but prefetching is prevented for another type of storage such as a cache. Other combinations of indications are possible and contemplated.

The reservation stations 208 act as an instruction queue where instructions wait until their operands become available. When operands are available and hardware resources are also available, the circuitry of the reservations stations 208 issue an instruction out-of-order to the integer and floating-point functional units 210 or to the load/store unit 220. The functional units 210 include arithmetic logic units (ALU's) for computational calculations such as addition, subtraction, multiplication, division, and square root. Additionally, circuitry in the functional units 210 determine an outcome of a conditional instruction such as a branch instruction.

The load/store unit (LSU) 220 receives memory requests, such as load and store operations, from one or more of decode unit 206 and the reservation stations 208. The load/store unit 220 includes queues and circuitry to execute memory requests. In an embodiment, the load/store unit 220 includes verification circuitry to ensure a load instruction receives forwarded data from the correct youngest store instruction. In various embodiments, the load/store unit 220 uses non-cache storage buffer 222, which has the equivalent functionality as the non-cache storage buffers 113A-113B (of FIG. 1). In various embodiments, the circuitry of the load/store unit 220 implements the non-cache storage buffer 222 using registers, one of a variety of flip-flop circuits, one of a variety of types of random access memories (RAMs), or a content addressable memory (CAM).

The non-cache storage buffer 222 is capable of storing data prevented from being stored in a cache such as the level-one (L1) data cache (d-cache) of block 230. In an embodiment, the non-cache storage buffer 222 stores data that lack one or more of temporal locality and spatial locality. The prefetcher 224 is capable of performing the operation of data prefetching as described earlier. In response to determining a flag in the tag of a memory request specifies that prefetching based on the target address of the memory request is prevented during processing of this instance of the memory request, one or more of the circuitry of the LSU 220 and the prefetcher 224 prevents data prefetching based on the target address of the memory request during processing of this instance of the memory request. In contrast, in response to determining the flag specifies prefetching based on the target address of the memory request is allowed during processing of this instance of the memory request, the prefetcher 224 performs the operation of data prefetching based on the target address of the memory request during processing of this instance of the memory request.

The load/store unit 220 issues memory requests to the level-one (L1) data cache (d-cache) of block 230. The L1 data cache of the block 230 uses a TLB, a tag array, a data array, a cache controller and the prefetch engine 232. The cache controller uses a variety of circuitry and queues such as read/write request queues, miss queues, read/write response queues, read/write schedulers, and a fill buffer. Similar to the prefetcher 224, the prefetch engine 232 is capable of performing the operation of data prefetching as described earlier. In some embodiments, the prefetch engine 232 is capable of generating prefetch requests to fill data from lower-level memory into one or more of the L1 data cache of block 230 and the non-cache storage buffer 222. In an embodiment, the prefetch engine 232 generates prefetch requests after monitoring a number of demand memory requests within an address range. The circuitry of block 230 receives the demand memory requests from the LSU 220.

Although no data is stored in the L1 data cache of block 230 for memory requests targeting the non-cache storage buffer 222, in some embodiments, the load/store unit 220 still sends an indication of the memory requests to the L1 data cache of block 230. To prevent poor performance of the prefetch engine 232 due to training based on target addresses of these types of memory requests, the flag is inserted in the tag of the memory requests. As described earlier, the flag specifies whether to allow or prevent data prefetching based on the target address of the memory requests during the processing of those instances of the memory requests.

In response to determining the flag specifies that prefetching based on the target address of the memory request is prevented during processing of this instance of the memory request, one or more of the circuitry of the block 230 and the prefetch engine 232 prevents performing one or more steps of the operation of data prefetching based on the target address of this instance of the memory request. In other words, one or more of the circuitry of the block 230 and the prefetch engine 232 prevents the prefetch engine 232 from generating prefetch requests and performing prefetch training based on the target address of this instance of the memory request. For prefetch hint instructions, the use of the flag is similar to the use of the flag for memory requests that target data that lack one or more of temporal locality and spatial locality.

In some embodiments, the processor core 200 also includes a level-two (L2) cache 240 for servicing memory requests from the L1 data cache 230 and the L1 instruction cache 202. The TLB of the block 240 services address mapping requests from the instruction TLB of block 202 and the data TLB of block 230. If a requested memory line is not found in the L1 data cache of block 230 or a requested memory line is not found in the instruction cache of block 202, then the corresponding cache controller sends a miss request to the L2 cache of block 240. When the requested memory line is not found in the L2 cache 240, then the L2 cache controller sends a miss request to access memory in lower-level memory such as a level-three (L3) cache or system memory.

The functional units 210 and the load/store unit 220 present results on a common data bus 212. The reorder buffer 218 receives results from the common data bus 212. In one embodiment, the reorder buffer 218 is a first-in first-out (FIFO) queue that ensures in-order retirement of instructions according to program order. Here, an instruction that receives its results is marked for retirement. If the instruction is head-of-the-queue, circuitry of the reorder buffer 218 sends its results to the register file 214. The register file 214 holds the architectural state of the general-purpose registers of processor core 200. Then the instruction in the reorder buffer 218 retires in-order and logic updates its head-of-queue pointer to point to the subsequent instruction in program order. The results on the common data bus 212 are also sent to the reservation stations 208 in order to forward values to operands of instructions waiting for the results. Multiple threads share multiple resources within core 200. For example, these multiple threads share each of the blocks 202-240 shown in FIG. 2.

It is noted that, in some embodiments, the processor core 200 uses separate buffers to implement the non-cache storage buffer 222. For example, in an embodiment, the processor core 200 uses a "streaming load buffer" capable of storing data targeted by load instructions that target data that lack one or more of spatial locality and temporal locality, and a separate write combining buffer capable of storing data targeted by store instructions that target data that lack one or more of spatial locality and temporal locality. These types of load instructions are also referred to as "streaming load instructions." Similarly, these types of store instructions are also referred to as "streaming store instructions."

Figure 3:
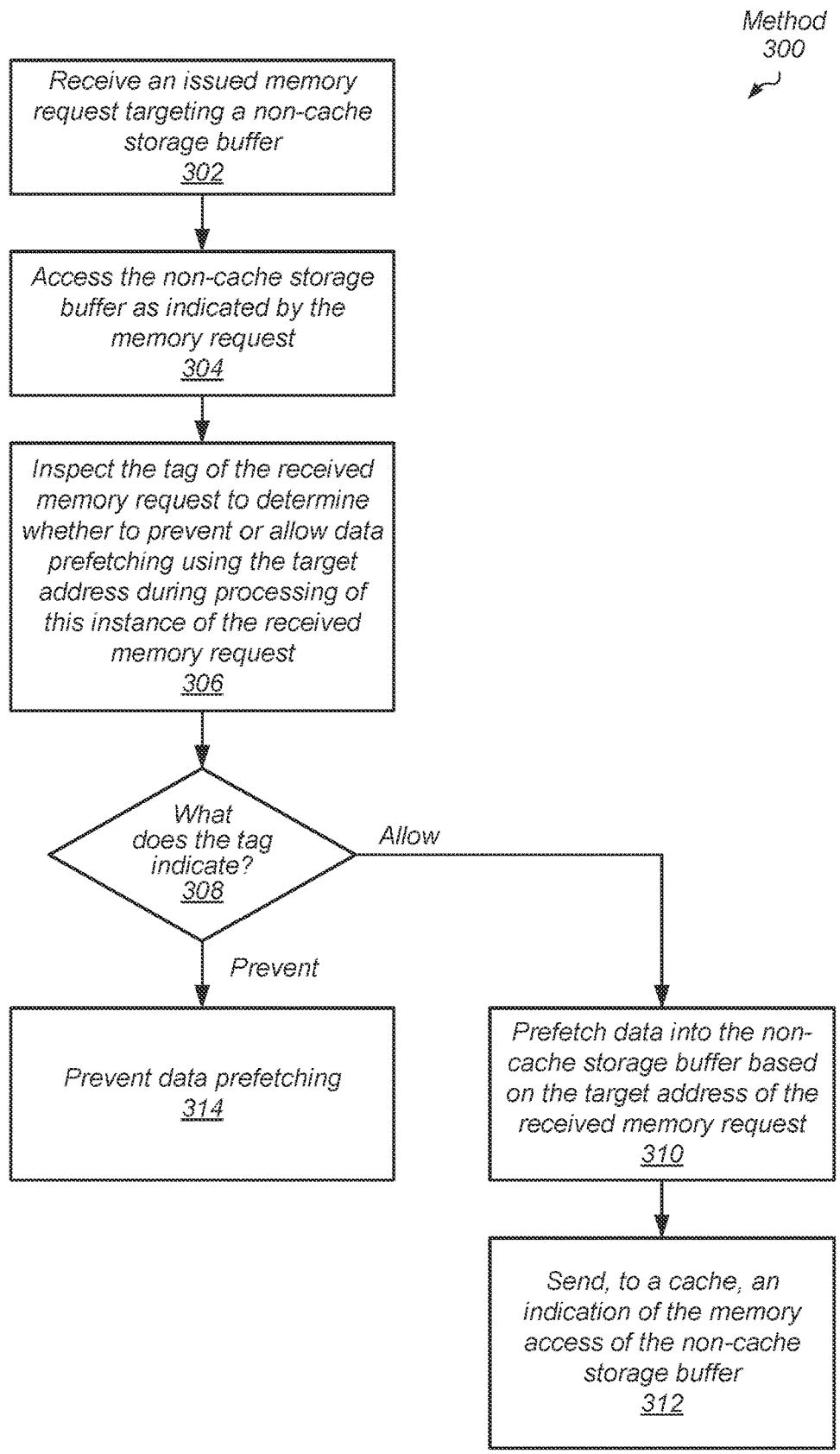
FIG. 3 is a generalized diagram of another embodiment of a method for processing a memory request lacking locality.

Referring now to FIG. 3, one embodiment of a method 300 for processing a memory request lacking locality is shown. For purposes of discussion, the steps in this embodiment (as well as in FIGS. 4-5) are shown in sequential order. However, in other embodiments some steps occur in a different order than shown, some steps are performed concurrently, some steps are combined with other steps, and some steps are absent.

In various embodiments, a processing unit includes at least a processor core, a cache, and a non-cache storage buffer capable of storing data prevented from being stored in the cache. When processing a memory request targeting the non-cache storage buffer, the processor core sends the memory request to circuitry of the non-cache storage buffer. Circuitry for the non-cache storage buffer receives the issued memory request targeting the non-cache storage buffer (block 302). In some embodiments, the non-cache storage buffer stores data that is not stored in a cache due to the data being targeted by memory requests that lack one or more of temporal locality and spatial locality. The access circuitry accesses the non-cache storage buffer as indicated by the memory request (block 304). For example, the memory request indicates whether the memory access is a read access or a write access. The circuitry of the non-cache storage buffer inspects the tag of the received memory request to determine whether to prevent or allow data prefetching using the target address of the memory request during processing of this instance of the memory request (block 306). For example, in one embodiment, the tag includes a flag that specifies whether to prevent or allow data prefetching during processing of this instance of the received memory request.

If the tag indicates allowing data prefetching during processing of this instance of the received memory request ("allow" branch of the conditional block 308), then a prefetch engine of the non-cache storage buffer generates one or more prefetch requests to prefetch data into the non-cache storage buffer based on the target address of the received memory request (block 310). In some embodiments, the target address of the memory request is sent to the prefetch engine, which initiates continuous prefetching after monitoring a number of demand memory accesses within an address range. This type of continuous prefetching is halted by the prefetching engine upon failed matches to successive memory access operations forwarded to the prefetching engine. In other embodiments, the prefetch engine automatically prefetches a number of cache lines based on the target address.

In some embodiments, one or more of the load/store unit and the circuitry of the non-cache storage buffer sends, to a cache, an indication of the memory access of the non-cache storage buffer (block 312). The cache receives the flag that indicates whether data prefetching is prevented or allowed during processing of this instance of the received memory request. The cache does not store the data requested by the received memory request, but a prefetch engine of the cache is capable of performing data prefetching or prefetching training based on the target address (request address) of the received memory request. In various embodiments, when the flag indicates prefetching is allowed during processing of this instance of the received memory request, the prefetch engine of the cache uses the target address to perform one or more of generating prefetch requests and training based on the target address. For example, the prefetch engine performs monitoring of a number of demand memory accesses within an address range.

If the tag indicates preventing data prefetching during processing of this instance of the received memory request ("prevent" branch of the conditional block 308), then data prefetching into the non-cache storage buffer and the cache is prevented during processing of this instance of the received memory request (block 314). Other memory requests, such as younger in-program-order memory requests and other instances of this memory request which have yet to be processed, that have a same target address may have data prefetching allowed for the target address. Each of the tags of those memory requests include a flag indicating whether to allow or prevent data prefetching based on the target address of the memory requests during the processing of those instances of the memory requests. However, during processing of this instance of the received memory request, data prefetching is prevented due to the indication specified by the flag stored in the tag of the received memory request. In some embodiments, the circuitry of the non-cache storage buffer does not send the target address of the received memory request to either of the prefetch engine of the non-cache storage buffer and the prefetch engine of the cache. In an embodiment, the circuitry of the non-cache storage buffer does not send any information of the received memory request to the cache. In other embodiments, the non-cache storage buffer sends information of the received memory request to the cache including the flag specifying whether prefetching is allowed or prevented during processing of this instance of the received memory request. In such embodiments, circuitry of one or more of the cache controller and the prefetch engine of the cache determine whether to allow or prevent generating prefetch requests and perform prefetch training based on the target address based on the received flag.

Figure 4:
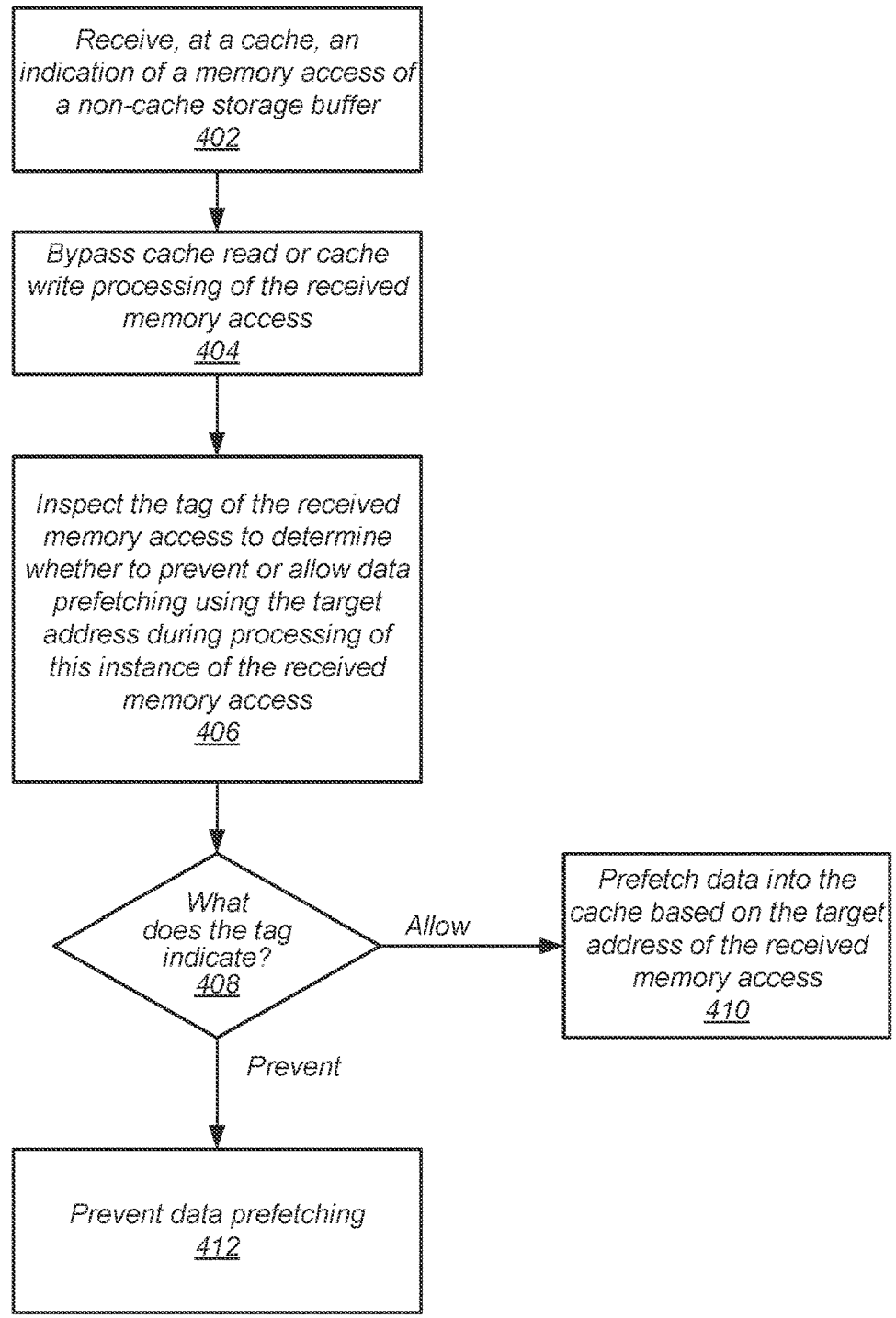
FIG. 4 is a generalized diagram of another embodiment of a method for efficiently processing memory requests.

Referring now to FIG. 4, one embodiment of a method 400 for processing a memory request lacking locality is shown. A cache receives an indication of a memory access of a non-cache storage buffer (block 402). In various embodiments, the memory access corresponds to a memory request targeting the non-cache storage buffer. The cache bypasses read or cache write processing of the received memory access (block 404). The circuitry of the cache inspects the tag of the received memory access to determine whether to prevent or allow data prefetching using the target address of the received memory access during processing of this instance of the memory access (block 406).

If the tag indicates allowing data prefetching during processing of this instance of the received memory access ("allow" branch of the conditional block 408), then a prefetch engine of the cache performs one or more of generating one or more prefetch requests and performing prefetch training based on the target address of the received memory access (block 410). However, if the tag indicates preventing data prefetching during processing of this instance of the received memory access ("prevent" branch of the conditional block 408), then the prefetch engine of the cache prevents performing one or more of generating one or more prefetch requests and performing prefetch training based on the target address of the received memory access (block 412). Other memory accesses, such as memory accesses corresponding to younger in-program-order memory requests and other instances of this memory access which have yet to be processed, that have a same target address may have data prefetching allowed for the target address. However, during processing of this instance of the received memory access, data prefetching is prevented due to the indication specified by the flag stored in the tag of the received memory access.

It is noted, in some embodiments, the circuitry supporting the non-cache storage buffer is external to the cache. Therefore, when the received memory request stores an indication specifying data prefetching is prevented during processing of this instance of the received memory request, in an embodiment, the non-cache storage buffer prevents sending the target address (request address) to the cache. In other embodiments, the prefetch engine of the cache still generates one or more prefetch requests based on the request address of the received memory access when the flag indicates preventing data prefetching during processing of this instance of the received memory access, but the cache controller provides a value for the least recently used (LRU) value used in a cache line replacement policy that limits an amount of time the prefetched data resides in the cache. Alternatively, the cache controller limits placement of the prefetched data in a particular way of the multi-way cache organization.

Figure 5:
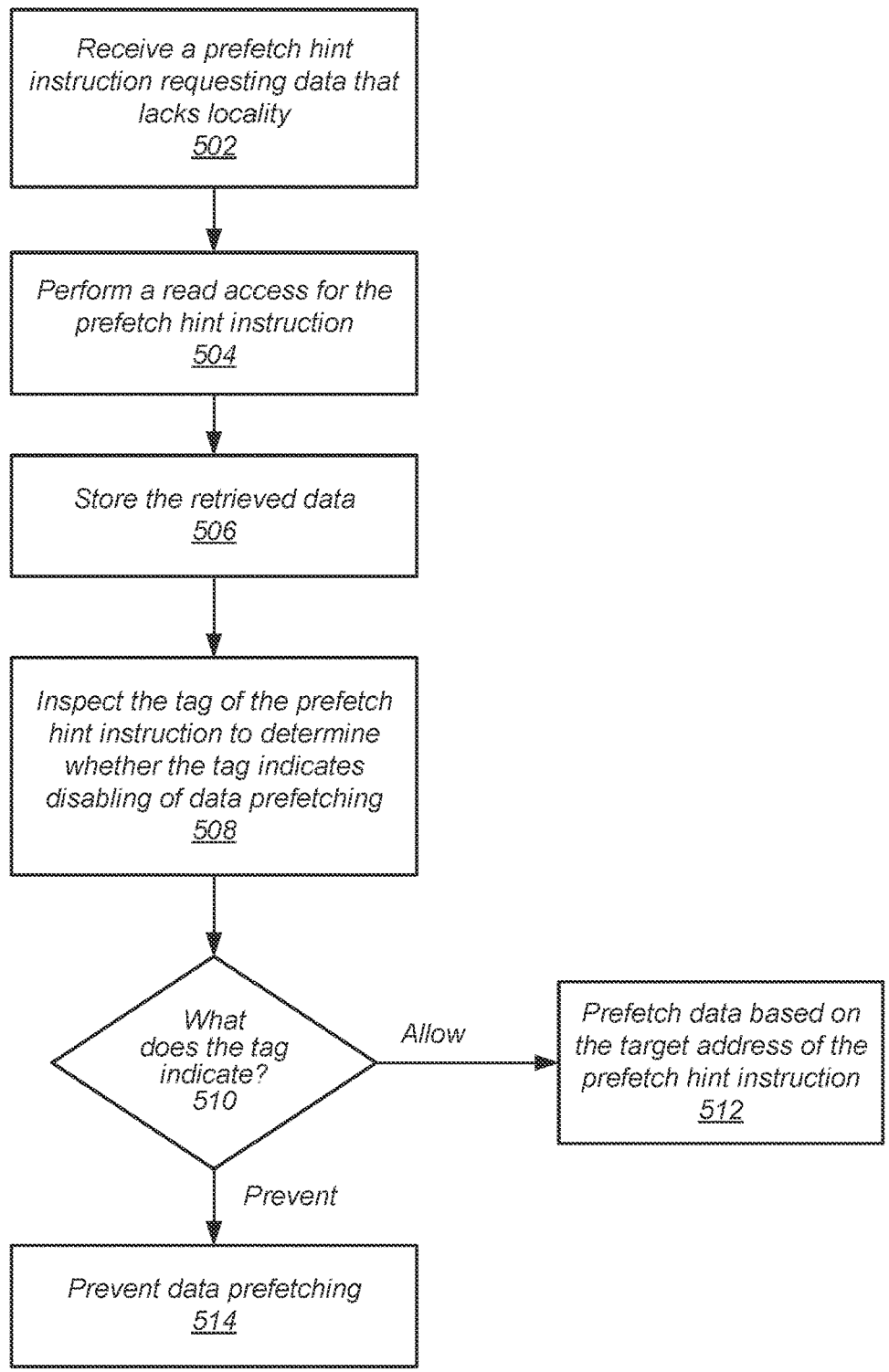
FIG. 5 is a generalized diagram of another embodiment of a method for efficiently processing memory requests.

Turning now to FIG. 5, one embodiment of a method 500 for processing a memory request lacking locality is shown. The circuitry of a unit of a processor, such as a load/store unit (LSU) or other unit of the processor, receives a prefetch hint instruction requesting data that lacks locality (block 502). An example of a prefetch hint instruction is the AMD 64-bit instruction PREFETCHNTA directed at data that lacks temporal locality. Other examples are possible and contemplated. Due to the indication in the prefetch hint instruction that specifies that the requested data lacks locality, the processor retrieves data for this prefetch hint instruction differently than other types of load instructions. In some embodiments, the processor retrieves data from system memory and stores the retrieved data in a particular level of the cache memory subsystem. For example, the level-two (L2) cache stores a copy of the retrieved data while the level-one (L1) cache and the level-three (L3) cache, if used, are bypassed. The processor also prefetches a particular amount of data based on the target address of the prefetch hint instruction. For example, in some cases, the processor fetches one or more cache lines based on the target address of the prefetch hint instruction. The processor does not store a copy of the retrieved data or prefetched data in any level of the cache memory subsystem when these types of data are later evicted from any cache. Other types of processing data for this prefetch hint instruction are possible and contemplated. With the use of a flag in the tag of the prefetch hint instruction, it is possible to prevent data prefetching as described earlier.

The processor performs a read access indicated by the received prefetch hint instruction (block 504). The processor retrieves data stored in a memory location pointed to by the target address of the prefetch hint instruction. The processor stores a copy of the retrieved data in one or more of the cache and the non-cache storage buffer (block 506). The particular level of the cache is based on design requirements, so in some examples, the L1 cache located closest to the processor core does not store a copy of the retrieved data, whereas, a L2 cache does store a copy of the retrieved data. Other storage arrangements are possible and contemplated. In some embodiments, when the prefetched data is stored in the cache, the corresponding cache controller sets a limit, in the cache data array, on storage time and/or storage location of data targeted by the prefetch hint instruction. For example, the cache controller provides a value for the least recently used (LRU) value used in a cache line replacement policy that limits an amount of time the prefetched data resides in the cache. The cache controller is also capable of limiting placement of the prefetched data in a particular way of a multi-way, set-associative cache organization.

The processor inspects the tag of the prefetch hint instruction to determine whether to prevent or allow data prefetching using the target address of the prefetch hint instruction during processing of this instance of the prefetch hint instruction (block 508). If the tag indicates allowing data prefetching during processing of this instance of the prefetch hint instruction ("allow" branch of the conditional block 510), then a prefetch engine of one or more of the cache and the non-cache storage buffer generates one or more prefetch requests based on the target address of the prefetch hint instruction (block 512). However, if the tag indicates preventing data prefetching during processing of this instance of the prefetch hint instruction ("prevent" branch of the conditional block 510), then the processor prevents the prefetch engine of one or more of the cache and the non-cache storage buffer from generating prefetch requests based on the target address of the prefetch hint instruction (block 514). In some embodiments, the processor prevents prefetching by preventing sending any information of the prefetch hint instruction to the prefetch engine of one or more of the cache and the non-cache storage buffer.

It is noted that one or more of the above-described embodiments include software. In such embodiments, the program instructions that implement the methods and/or mechanisms are conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium includes any storage media accessible by a computer during use to provide instructions and/or data to the computer. For example, a computer accessible storage medium includes storage media such as magnetic or optical media, e.g., disk (fixed or removable), tape, CD-ROM, or DVD-ROM, CD-R, CD-RW, DVD-R, DVD-RW, or Blu-Ray. Storage media further includes volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media includes microelectromechanical systems (MEMS), as well as storage media accessible via a communication medium such as a network and/or a wireless link.

Additionally, in various embodiments, program instructions include behavioral-level descriptions or register-transfer level (RTL) descriptions of the hardware functionality in a high level programming language such as C, or a design language (HDL) such as Verilog, VHDL, or database format such as GDS II stream format (GDSII). In some cases the description is read by a synthesis tool, which synthesizes the description to produce a netlist including a list of gates from a synthesis library. The netlist includes a set of gates, which also represent the functionality of the hardware including the system. The netlist is then placed and routed to produce a data set describing geometric shapes to be applied to masks. The masks are then used in various semiconductor fabrication steps to produce a semiconductor circuit or circuits corresponding to the system. Alternatively, the instructions on the computer accessible storage medium are the netlist (with or without the synthesis library) or the data set, as desired. Additionally, the instructions are utilized for purposes of emulation by a hardware based type emulator from such vendors as Cadence®, EVE®, and Mentor Graphics®.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus comprising:
a non-cache storage buffer; and
circuitry configured to:
receive a first memory request targeting the non-cache storage buffer;
prevent data prefetching into the non-cache storage buffer based at least in part on the first memory request;
receive a second memory request targeting the non-cache storage buffer;
determine that the second memory request comprises an indication specifying that data prefetching is allowed using a target address of the first memory request; and
allow data prefetching into the non-cache storage buffer based at least in part on the second memory request.

2. The apparatus as recited in claim 1, wherein the circuitry is further configured to prevent data prefetching into the non-cache storage buffer based at least in part on the first memory request, responsive to the first memory request comprising a first indication specifying that data prefetching is prevented using a target address of the first memory request.

3. The apparatus as recited in claim 2, wherein, based at least in part on the determination that the first memory request comprises the first indication, the circuitry is further configured to prevent data prefetching into a cache using the target address of the first memory request.

4. The apparatus as recited in claim 1, wherein the first memory request is a memory request that lacks one or more of temporal locality and spatial locality.

5. The apparatus as recited in claim 1, wherein the circuitry is further configured to:
   receive a third memory request; and
   set a limit, in a cache, on one or more of storage time and storage location in the cache regarding data retrieved from lower-level memory into the cache during processing of the third memory request.

6. The apparatus as recited in claim 5, wherein the circuitry is further configured to determine that the third memory request is a prefetch hint instruction comprising a third indication specifying setting the limit.

7. A method comprising:
   receiving, by circuitry, a first memory request targeting a non-cache storage buffer;
   preventing, by the circuitry, data prefetching into the non-cache storage buffer based at least in part on the first memory request;
   receiving a second memory request targeting the non-cache storage buffer;
   determining that the second memory request comprises an indication specifying that data prefetching is allowed using a target address of the first memory request; and
   allowing data prefetching into the non-cache storage buffer based at least in part on the second memory request.

8. The method as recited in claim 7, further comprising preventing, by the circuitry, data prefetching into the non-cache storage buffer based at least in part on the first memory request, responsive to the first memory request comprising a first indication specifying that data prefetching is prevented using a target address of the first memory request.

9. The method as recited in claim 8, wherein in response to determining that the first memory request comprises the first indication, the method further comprises preventing data prefetching into a cache using the target address of the first memory request.

10. The method as recited in claim 7, further comprising:
    receiving a third memory request; and
    setting a limit, in a cache, on one or more of storage time and storage location in the cache regarding data retrieved from lower-level memory into the cache during processing of the third memory request.

11. The method as recited in claim 10, further comprising determining that the third memory request is a prefetch hint instruction comprising a third indication specifying setting the limit.

12. A processing unit comprising:
    a processor core comprising a non-cache storage buffer; and
    circuitry configured to:
       receive a first memory request targeting the non-cache storage buffer;
       prevent data prefetching into the non-cache storage buffer based at least in part on the first memory request, based at least in part on the first memory request comprising a first indication that data prefetching is prevented using a target address of the first memory request;
       receive a second memory request targeting the non-cache storage buffer; and
       allow data prefetching into the non-cache storage buffer based at least in part on the second memory request.

13. The processing unit as recited in claim 12, wherein the circuitry is further configured to determine that the second memory request comprises a second indication specifying that data prefetching is allowed using a target address of the first memory request.

* * * * *